United States Patent [19]
Gregoire

[11] Patent Number: 6,098,662
[45] Date of Patent: Aug. 8, 2000

[54] VACUUM GENERATOR WITH INCORPORATED CHECK VALVE

[75] Inventor: Roger J. Gregoire, Bulverde, Tex.

[73] Assignee: Advanced Pressure Technology, Inc., Napa, Calif.

[21] Appl. No.: 09/187,156

[22] Filed: Nov. 6, 1998

Related U.S. Application Data

[60] Provisional application No. 60/067,139, Dec. 2, 1997.

[51] Int. Cl.[7] .................................................. G05D 11/03
[52] U.S. Cl. ........................... 137/891; 137/895; 417/184
[58] Field of Search ..................................... 137/891, 892, 137/895; 417/183, 184

[56] References Cited

U.S. PATENT DOCUMENTS

| | | | |
|---|---|---|---|
| 3,257,180 | 6/1966 | King | 137/895 |
| 3,643,688 | 2/1972 | Meinert | 137/891 |
| 4,367,626 | 1/1983 | Schwartzmann | 417/183 |
| 4,681,372 | 7/1987 | McClure | 417/183 |

FOREIGN PATENT DOCUMENTS

802691  10/1958  United Kingdom ................... 137/891

*Primary Examiner*—Stephen M. Hepperle
*Attorney, Agent, or Firm*—Royston, Rayzor, Vickery, Novak & Druce, L.L.P.

[57] ABSTRACT

A longitudinally compact vacuum generator having an incorporated check valve. The generator includes a valve assembly housing having top and bottom portions. An exhaust housing is coupled to the top portion of the valve assembly and a venturi inlet port is located in the bottom portion of the valve assembly. A vacuum inlet port is configured in fluid communication with a suction chamber within the valve assembly and a pneumatic valve pressure supply port is configured in fluid communication with a pneumatic pressure supply channel.

20 Claims, 6 Drawing Sheets

FIG. 3c — "Checked" Position

FIG. 3b — Actuated Open

FIG. 3a — Normally Closed

FIG. 4

VACUUM GENERATOR WITH INCORPORATED CHECK VALVE

RELATED PATENT APPLICATIONS

This patent application claims priority to U.S. Provisional Application Ser. No. 60/067,139 filed Dec. 2, 1997 entitled VACUUM GENERATOR WITH INCORPORATED CHECK VALVE, said application in its entirety is hereby expressly incorporated by reference into the present application.

DESCRIPTION

1. Technical Field

The present invention relates generally to valve systems used to establish a vacuum utilizing a venturi; and more specifically, to valve systems used to establish a vacuum utilizing a venturi and incorporating a supplemental one-way valve providing a check feature for protecting source gas supplies.

2. Background Art

It is well known in many manufacturing processes to use a venturi to create a vacuum and establish suction for drawing away predominantly gaseous fluids. Normally, these waste gases are either noxious, hazardous or both, and they are desired to be drawn away and exhausted remotely. One industry in which the application of such an exhaust suction is desired is the semi-conductor manufacturing industry. In semi-conductor manufacturing processes, it is common to use hazardous and corrosive gases as a medium for etching circuits into the semi-conductor components. Examples of such gases include hydrogen bromide and hydrogen chloride. Each of these gases is significantly corrosive and therefore must be specially handled to contain their corrosive effects.

The utilized corrosive gases are typically supplied from a pressured source that must be occasionally exchanged and replenished. Prior to an exchange, however, residual gases typically remain within the etching chamber. These residual gases must be removed prior to the actual exchange. Removal is typically accomplished through a dilution purging process wherein the chamber is cyclically pressured with diluting gas such as nitrogen and then purged using a suction such as that generated through a venturi established vacuum. In a typical purging process, it is not uncommon for as many as twenty cycles or more between pressurization and purging to be required to achieve a sufficiently dilute residual gas component. A common method by which the required vacuum is established is to pass a pressured nitrogen stream through a venturi neck thereby creating the requisite vacuum. During a vacuum stage of the purging process, the offending residual gas is exhausted together with the venturi-creating source nitrogen. These mixed gases are then exhausted to a scrubber that eliminates the offensive components of the gas flow.

A dilution purging process is initiated again after the new corrosive gas source is connected to the etching chamber. The reason for purging at this stage of the manufacturing process is that air and other gases may be contained within the connective conduits between the etching chamber and the corrosive gas source. These stray gases must be removed prior to reinitiation of the etching procedures. Once again, the venturi created vacuum is used to supply the purging suction. During these alternating pressuring and purging cycles, or when the etching gases are being supplied to the etching chamber, it is possible for significant pressures to be experienced in the flow line leading to the nitrogen supply used to create the venturi vacuum. As a result of these pressures, backflows toward the nitrogen supply are possible. Since the nitrogen supply is typically common to other applications, it is imperative that that nitrogen supply be maintained contaminant free. In order to prevent such backflow contamination, check valves have been typically included in series between the venturi gas supply and the housing within which a control valve and the vacuum chamber are contained. This series arrangement has the effect of extending the length of the required control assembly. Since the spaces within which these control assemblies are located are often limited, the use of such elongate assemblies may be cumbersome, difficult or impossible. Therefore, it should be appreciated that any reduction in length of the control assembly will be beneficial in almost all settings, and will enable the assembly's use in locations that would have previously been restricted.

It is not uncommon for moisture to be present in the conveying channels of the vacuum generator. This condition is especially prevalent in the exhaust channels when connected to scrubbers. The presence of such moisture can significantly compromise the structures of the vacuum generator and its component conduits because the moisture typically adheres to those channels' surfaces and attracts the corrosive gases. When the corrosive gases contact the moisture adhering to the conduit walls, that moisture becomes corrosive and resultingly compromises the structural integrity and performance of those conveyances. Therefore, it should be appreciated that the reduction or elimination of such moisture's presence in these conduits will significantly enhance the performance and longevity of the vacuum generator assemblies.

In view of the above described deficiencies associated with the use of known designs for valve systems used to establish a vacuum utilizing a venturi, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to known checked venturi systems used in the establishment of vacuums. The invention also incorporates additional beneficial features that will become evident to those skilled in the art. The length of the assembly required to establish suction, and also provide a check feature, for a venturi producing gas supply has been minimized by novelly arranging the several required components into a single valve assembly housing having significantly reduced end-to-end length. This feature is accomplished in each of the exemplary embodiments of the present invention by providing a check valve as an associated component with a pneumatically responsive valve primarily responsible for actuation of the vacuum generating system. Among other beneficial characteristics, the present invention positions a biasing spring for the check valve head within a common channel extending along the central axis of the pneumatic valve through which vacuum producing venturi gas passes.

In one alternative embodiment, a bleed poppet valve is supplementarily included within the body of the check valve head, thereby selectively permitting a bleed flow of venturi gas through the vacuum generating system. The bleed flow of gas is desired to purge the conduits of the system of moisture that may be present therein. The source gas that is bled into the system is normally clean and dry and therefore maintains the interiors of the conduits through which it passes in a similar clean and dry condition. As described hereinabove, a lack of moisture on dry walls of the conduits will prevent adherence of the corrosive components suctioned from the etching chambers, thereby preserving and enhancing the performance of the system. It should be appreciated, however, that the bleed valve also incorporates a check feature so that flow from the clean gas supply is permitted only into the system, and not back into the supply.

The general beneficial effects described above apply generally to each of the exemplary descriptions and characterizations of the devices, mechanisms and systems disclosed herein. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 2:
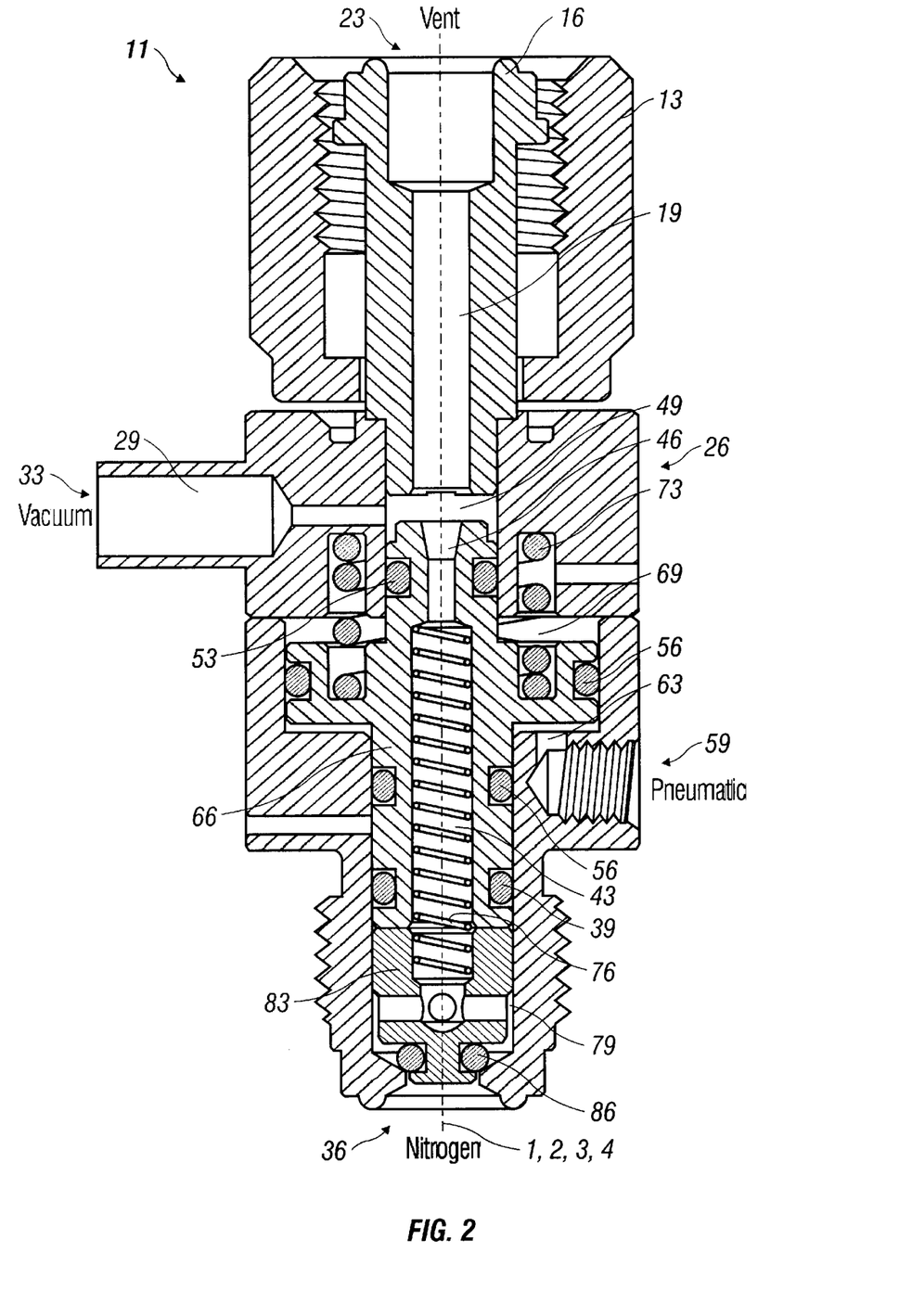
FIG. 2 is a cross-sectional view of one embodiment of the vacuum producing assembly.
Figure 4:
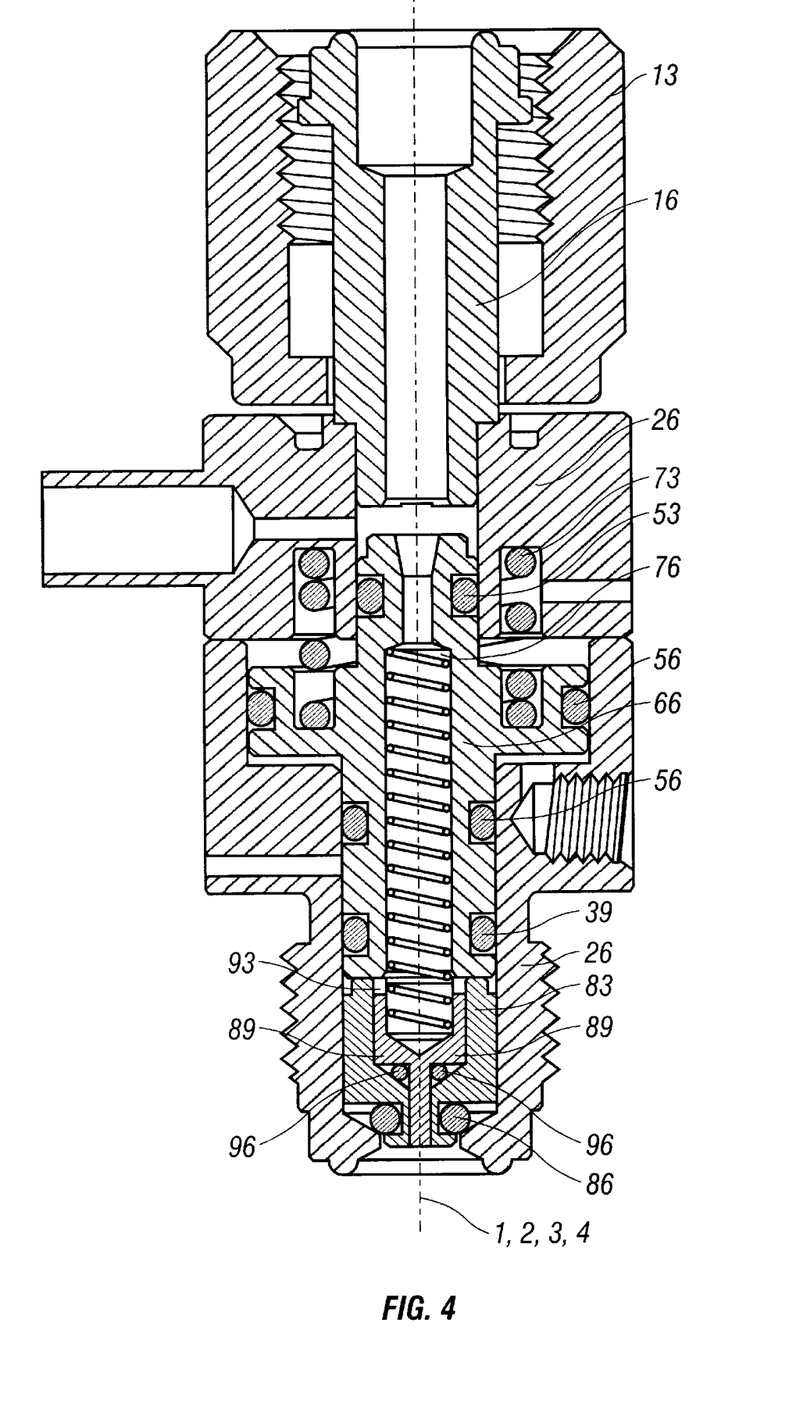
FIG. 4 is a cross-sectional view of an alternative embodiment of the vacuum producing assembly that includes an optional bleed poppet valve.

Referring to FIGS. 2 and 4, two alternative embodiments of the present invention are illustrated. All primary components of the vacuum producing assembly 11 are shared between the two illustrated embodiments; however, FIG. 4 additionally includes a bleed poppet valve head 89 as an optional accessory to the check valve head 83 which is also included in the embodiment of FIG. 2. Therefore, like reference numerals have been utilized for each of the two embodiments which are substantially identical except for the supplemental feature of the bleed poppet assembly.

Figure 1:
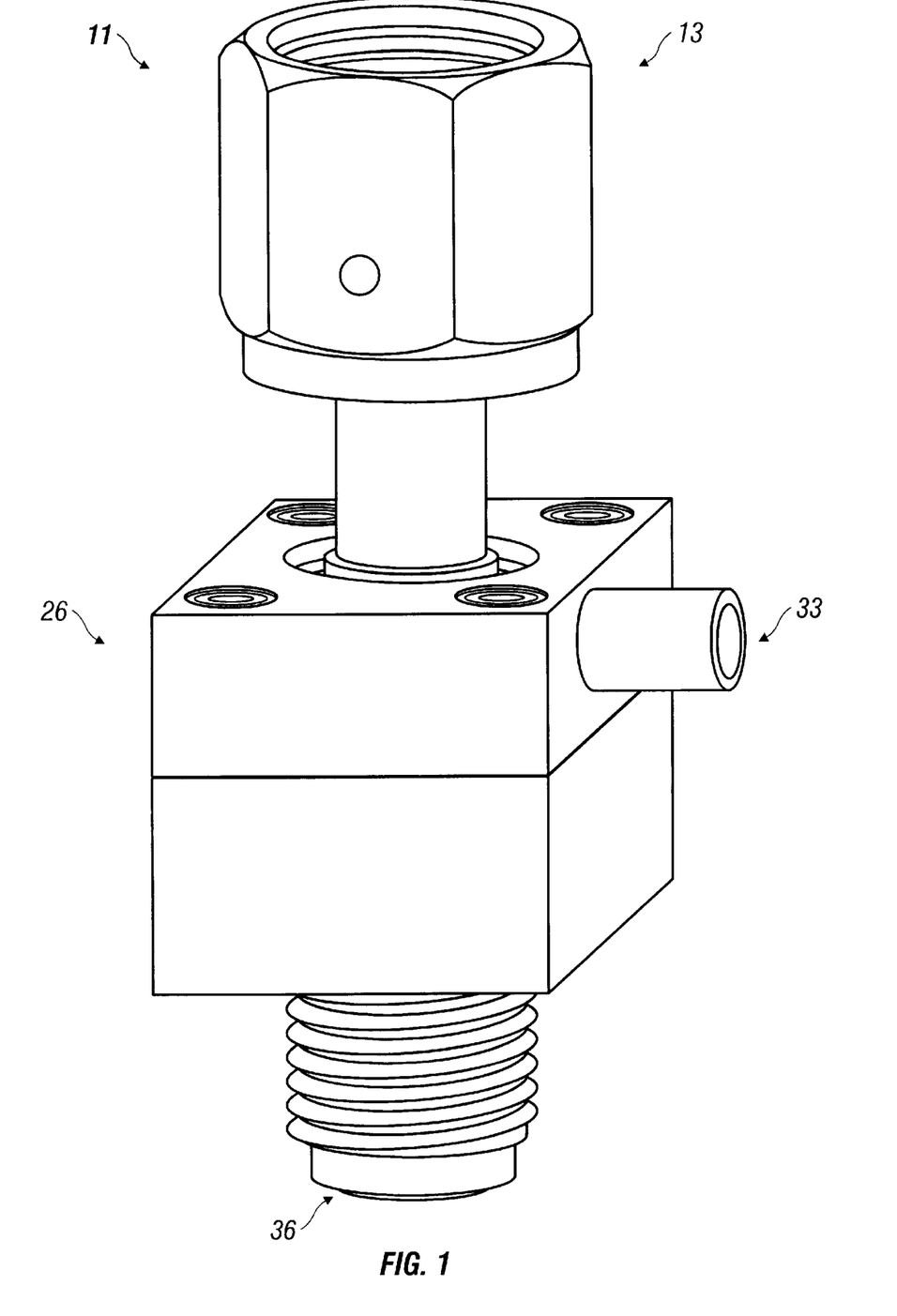
FIG. 1 is a perspective view of the exterior of the vacuum producing assembly of the present invention.
Figure 6A:
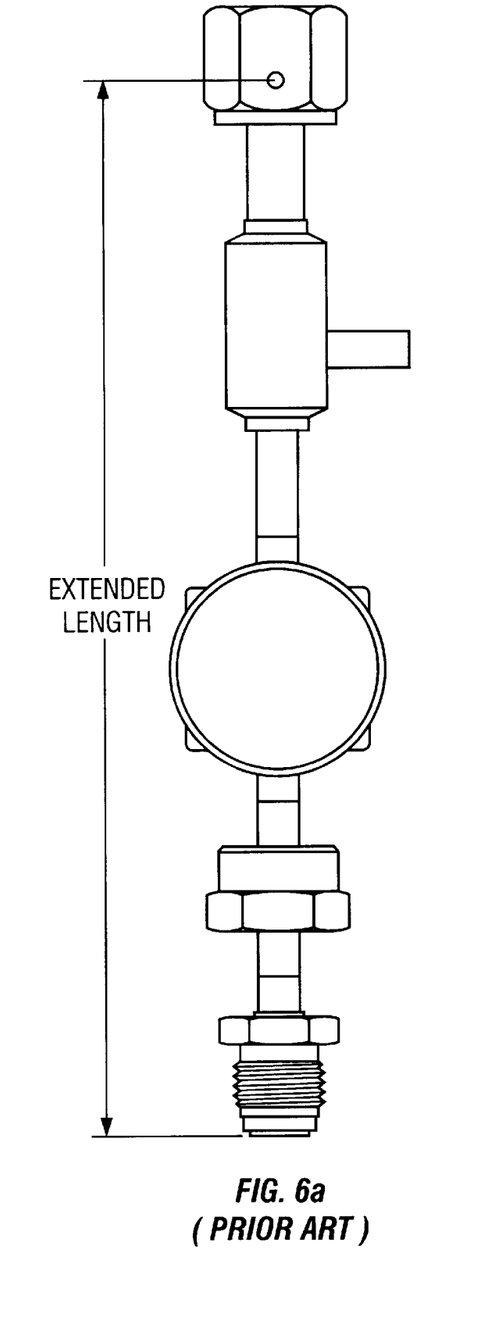
FIGS. 6a and 6b provide lengthwise comparisons between a known prior art configuration for a vacuum producing assembly shown in FIG. 6a and the substantially shortened length of the present invention illustrated in FIG. 6b.
Figure 6B:
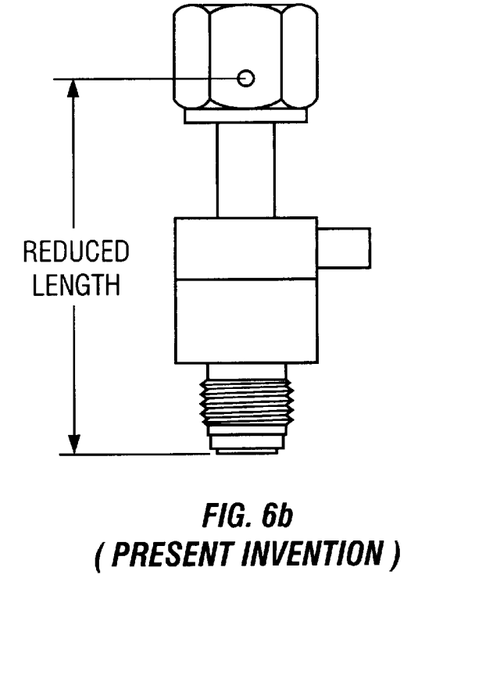

Referring to FIG. 1, the clean and compact exterior construction of the vacuum producing assembly 11 may be appreciated. The overall reduction in the assembly's 11 length is best appreciated by comparison between that assembly 11, as shown in FIG. 6b, and a prior art configuration, illustrated in FIG. 6a. Referring to FIG. 2, the several cooperating components of the vacuum producing assembly 11 may be appreciated. Two primary housings 13,26 are connected one to the other in a stacked configuration. The top enclosure is an exhaust housing 13 that is connected above a valve assembly housing 26. It should be appreciated that the valve assembly housing 26 has an upper and a lower portion, each separable from the other in the assembly process when a pneumatic valve 66 is installed therein. Since the assemblies of the present invention are often certified for specific purposes, it is important that the top and bottom portions of the valve assembly housing 26 only be disengaged by those persons certified for maintenance and repair. Therefore, the two portions' joinder is typically arranged to be tamper-proof, or at least tamper-evidencing.

The exhaust housing 13 has an exhaust outlet gland 16 connected therein and arranged to establish an exhaust channel 19 extending longitudinally therethrough. The exhaust channel 19 terminates in an exhaust exit port 23 through which waste gas and supplied pressured gas are expelled or communicated into an extending conveyance. The extending conveyance would normally be a conduit to an ultimate receiver, typically a scrubber unit utilized to remove contaminants from the gas flow.

The upper and lower portions of the valve assembly housing 26 establish a suction chamber 49 toward the top of the housing assembly 26 and a pneumatic valve receiving chamber 69 in a central portion of the housing 26. A venturi neck 46 is located adjacent to the suction chamber 49 in a pneumatic valve 66 and is arranged so that a venturi is established when pressured gas is supplied and passed through the neck 46 and across the chamber 49. A vacuum channel 29 is connected in fluid communication with the suction chamber 49 and terminates in a vacuum inlet port 33. The vacuum inlet port 33 may be exposed directly to a gas to be suctioned and exhausted, or it may provide a receiver for connecting a suction conveyance such as a tubular conduit.

The pneumatic valve 66 is housed within the pneumatic valve receiving chamber 69 established within the central and lower portion of the valve assembly housing 26. The receiving chamber 69 is configured to permit longitudinal reciprocation of the valve 66 therein. The valve 66 is reciprocated within the chamber 69 under two affecting forces. The first is a downwardly biasing force exerted by a primary biasing spring 73 that is also contained within the valve assembly housing 26. The second force is an urging force directed upwardly, and results from the application of pneumatic pressure supplied through a pneumatic pressure supply port 59 at a distal end of a pneumatic pressure supply channel 63. The actuating magnitude of the pneumatic force is sufficient to overcome the downward pressure of the primary biasing spring 73. The pneumatic pressure is contained between two o-rings 56 and acts on the exposed surface area of the valve 66 between those o-rings 56. In a similar manner, suction containment o-ring 53 is provided near a top end of the pneumatic valve for establishing a sealing partition below the suction chamber 49.

Figure 3A:
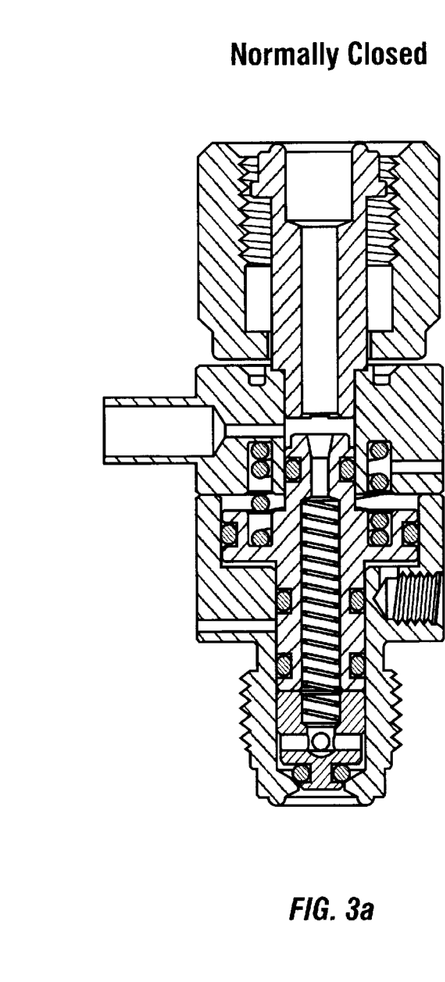
FIG. 3a shows the embodiment of the vacuum producing assembly illustrated in FIG. 2 configured to a closed position.
Figure 3B:
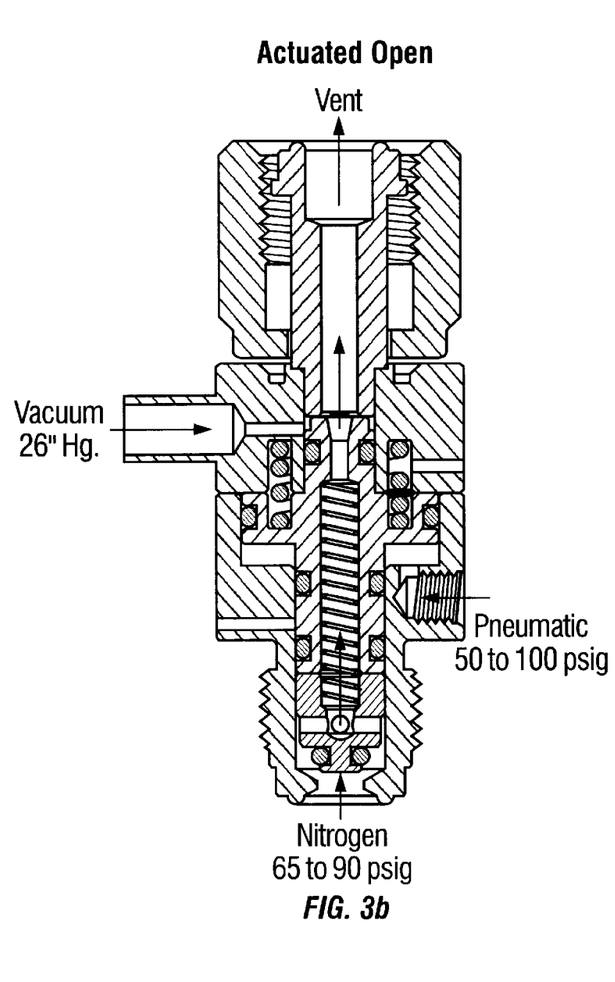
FIG. 3b shows the embodiment of the vacuum producing assembly illustrated in FIG. 2 configured to a pneumatically actuated open position.

As may be best appreciated in a comparison between FIGS. 3a and 3b, the primary biasing spring 73 urges the pneumatic valve 66 and check valve 83 toward a closed configuration in which admission of pressured venturi establishing gas is blocked. FIG. 3b illustrates the configuration wherein pneumatic pressure is applied. The pneumatic valve 66 moves upwardly, overpowering the primary biasing spring 63, and the pressure of the venturi producing gas overcomes a check valve biasing spring 76. In this configuration, the venturi producing gas, which is illustrated as nitrogen, flows around and into the check valve head 83 and is conveyed upwardly through a centralized venturi gas channel 43 that extends through the body of the pneumatic valve 66. The venturi gas is supplied through a venturi gas inlet port 36 and is substantially contained within a check valve receiving chamber 79 by a venturi gas containment o-ring 39. As the check valve head 83 reciprocates downwardly, a venturi gas blocking seal is established as the check valve head 83 causes a check valve o-ring 86 to sealingly engage between the check valve head 83 and a seating surface at a lower end of the check valve receiving chamber 79.

Figure 3C:
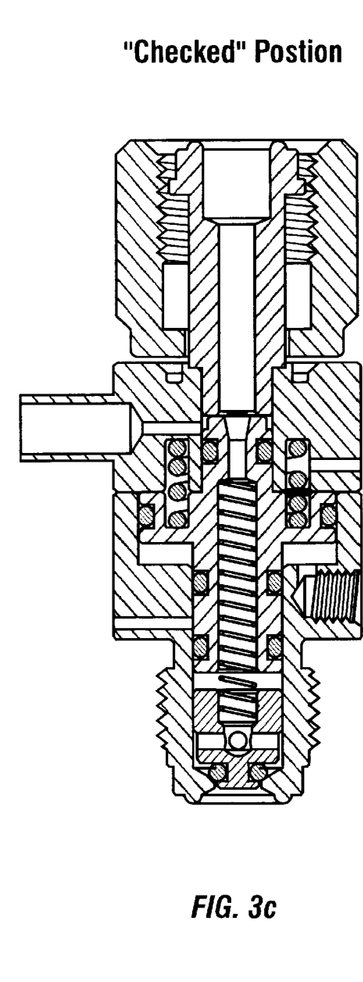
FIG. 3c shows the embodiment of the vacuum producing assembly illustrated in FIG. 2 configured to a pneumatically actuated open position, but with the check valve closed to a checked position.

FIG. 3c illustrates the vacuum producing assembly in a checked configuration resulting from a downstream pressure rise, typically experienced in the suction chamber 49. This downstream pressure rise assists the check valve biasing spring 76 in overcoming the pressure at which the venturi gas is supplied. Once the pressure rise condition has subsided, the venturi producing gas will once again overcome the check valve biasing spring 76 and the vacuum will resume being produced in response to the pneumatically actuated valve's 66 open position.

Figure 5A:
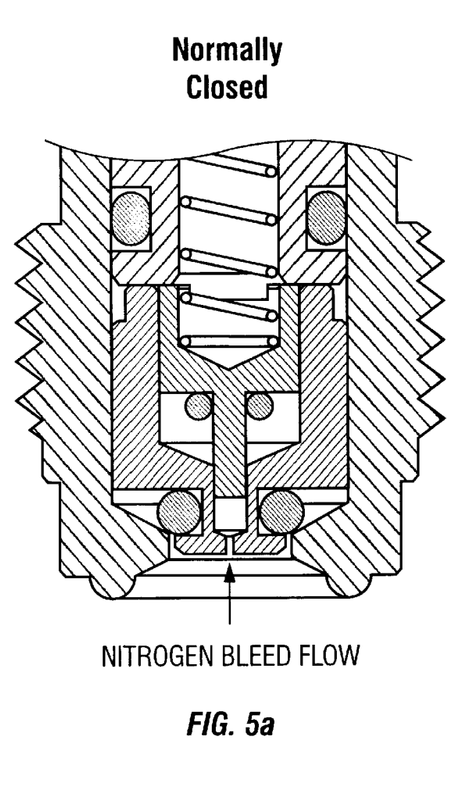
FIG. 5a shows the embodiment of the vacuum producing assembly illustrated in FIG. 4 configured to a closed position.
Figure 5B:
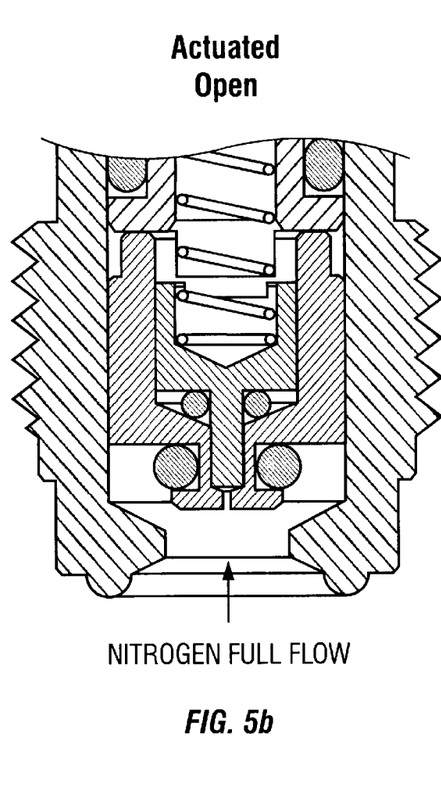
FIG. 5b shows the embodiment of the vacuum producing assembly illustrated in FIG. 2 configured to a pneumatically actuated open position.
Figure 5C:
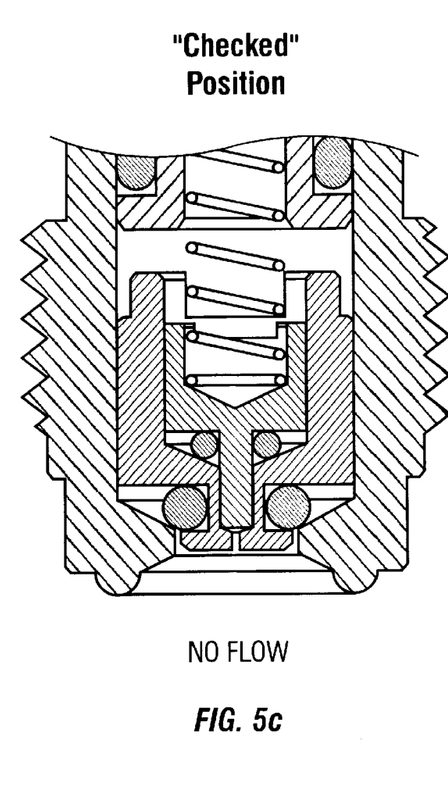
FIG. 5c shows the embodiment of the vacuum producing assembly illustrated in FIG. 2 configured to a pneumatically actuated open position, but with the check valve and bleed valve closed to a checked position.

The provision of a bleed poppet valve assembly 87, as illustrated in FIGS. 4 and 5, permits a bleed flow of venturi producing gas even when the pneumatic valve 66 is in a closed position. The poppet valve assembly 87 includes the poppet valve head 89 reciprocatingly located in a receiving chamber within the check valve head 83. Bleeding and sealed configurations of the poppet valve assembly 87 are controlled by a bleed poppet valve o-ring 96 about a stem of the poppet valve head 89. The check valve biasing spring 76 also acts on the poppet valve head 89, as well as the check valve head 83. The poppet valve head 89, acting under the influence of the pressured nitrogen gas supply is capable of overcoming the biasing force of the spring 76 when no back pressure is experienced, thereby permitting a bleed flow of the clean and dry nitrogen into the vacuum generating assembly. If a back pressure is experienced, as described hereinabove, the admittance of bleed venturi producing gas may be absolutely blocked as illustrated in FIG. 5c. In this configuration, the check valve head 83 and the poppet valve head 89 are each biased downwardly into sealing engagement upon appropriate sealing o-rings. Alternatively, the poppet valve head 89 may be biased downward as illustrated in FIG. 5b; however, the larger check valve head 83 is raised upwardly so that the check valve 83 and pneumatic valve 66 are opened permitting venturi gas flow and the production of a vacuum and suction. FIG. 2 also illustrates the coincident positioning of the central longitudinal axes 1, 2, 3, 4, and 5 of the valve assembly housing 26, the pneumatic valve 66, the check valve 83, the venturi gas channel 43, and the poppet valve 87 (FIG. 4). FIG. 4 also shows an exemplarily compact overall length of the vacuum producing assembly 11 being 2.5 inches, as well as a preferred configuration in which the pneumatic valve 66, the check valve 83, the venturi gas channel 43, and the poppet valve 87 are contained in their entireties within the valve assembly housing 26.

Through the several novelly configured valve assembly combinations, the vacuum producing assembly 11 of the present invention permits substantially reduced lengths for these new assemblies in comparison to previously known assemblies, having separate assemblies connected in series, for performance of similar functions. The optional inclusion of the bleed valve assembly 87 minimizes corrosive activity within the assembly by eliminating moisture that can react with corrosive gases passing therethrough.

Although the present invention has been described and illustrated in detail, it is to be clearly understood that the same is by way of illustration and example only, and is not to be taken as a limitation. The spirit and scope of the present invention are to be limited only by the terms of any claims that may be presented hereafter.

INDUSTRIAL APPLICABILITY

The present invention finds applicability in manufacturing processes in which waste gas products are required to be suctioned away. Specifically, the reduced length vacuum producing assemblies, as disclosed herein, are advantageously incorporated into the manufacture of semiconductor components.

What is claimed and desired to be secured by Letters Patent is as follows:

1. A longitudinally compact vacuum generator having an incorporated check valve, said generator comprising:

a valve assembly housing having top and bottom portions;

said portions establishing a suction chamber toward said top portion of said assembly housing and a pneumatic valve receiving chamber toward a central portion of said assembly housing;

an exhaust housing coupled to said top portion of said valve assembly, said exhaust housing having an exhaust outlet gland connected therein and arranged to establish an exhaust channel extending longitudinally therethrough, said exhaust channel terminates in an exhaust exit port;

a venturi inlet port located in said bottom portion of said valve assembly;

a venturi neck located adjacent to said suction chamber in a pneumatic valve;

said pneumatic valve being housed within said pneumatic valve receiving chamber;

a vacuum inlet port linked to a suction chamber within said valve assembly;

a vacuum channel connected to said suction chamber and terminating in said vacuum inlet port;

a pneumatic valve pressure supply port connected to said suction chamber within said valve assembly; and a check valve having a check valve head attached to a centralized venturi gas channel that extends through said pneumatic valve.

2. The invention as recited in claim 1, wherein said pneumatic valve is reciprocated within said chamber under a downwardly biasing force exerted by a primary biasing spring.

3. The invention as recited in claim 1, wherein said pneumatic valve is reciprocated within said chamber under an urging force directed upwardly being supplied through a pneumatic pressure supply port at a distal end of a pneumatic pressure supply channel.

4. The invention as recited in claim 1, further comprising:

a suction containment o-ring being provided near a top end of said pneumatic valve for establishing a sealing partition.

5. A longitudinally compact vacuum generator having an incorporated check valve, said generator comprising:

a valve assembly housing having top and bottom portions;

said portions establishing a suction chamber toward said top portion of said assembly housing and a pneumatic valve receiving chamber toward a central portion of said assembly housing;

an exhaust housing coupled to said top portion of said valve assembly, said exhaust housing having an exhaust outlet gland connected therein and arranged to establish an exhaust channel extending longitudinally therethrough, said exhaust channel terminates in an exhaust exit port;

a venturi inlet port located in said bottom portion of said valve assembly;

a venturi neck located adjacent to said suction chamber in a pneumatic valve;

said pneumatic valve being housed within said pneumatic valve receiving chamber;

a vacuum inlet port linked to a suction chamber within said valve assembly;

a vacuum channel connected to said suction chamber and terminating in said vacuum inlet port;

a pneumatic valve pressure supply port connected to said suction chamber within said valve assembly;

a check valve having a check valve head attached to a centralized venturi gas channel that extends through said pneumatic valve; and a bleed poppet valve assembly having a poppet valve head reciprocatingly located in a receiving chamber within said check valve head.

6. The invention as recited in claim 5, wherein said bleed poppet valve assembly further comprises bleeding and sealed configurations controlled by a bleed poppet valve o-ring about a stem of said poppet valve head.

7. The longitudinally compact vacuum generator, as recited in claim 5, wherein said check valve head and said poppet valve head are each biased downwardly into a sealing engagement upon appropriate sealing o-rings.

8. The longitudinally compact vacuum generator, as recited in claim 5, wherein said poppet valve head is biased downward and said check valve head is raised upwardly, whereby said check valve and said pneumatic valve are opened.

9. A longitudinally compact vacuum generator, said generator comprising:

a valve assembly housing having top and bottom portions and a central longitudinal axis, said valve assembly configured to accommodate fluid communication between a vacuum inlet port and an exhaust exit port;

a pneumatic valve having at least a portion thereof reciprocatingly housed within said valve assembly, said pneumatic valve having a central longitudinal axis substantially parallel with said central longitudinal axis of said valve assembly and said pneumatic valve configured for selectively establishing fluid communication between said vacuum inlet port and said exhaust exit port based on a reciprocated position of said pneumatic valve; and a check valve having at least a portion thereof reciprocatingly housed within said valve assembly, said pneumatic valve having a central longitudinal axis substantially parallel with said central longitudinal axis of said valve assembly and said central longitudinal axis of said pneumatic valve, said check valve configured for selectively permitting fluid passage through a venturi gas channel based on a reciprocated position of said check valve and said venturi gas channel having a central longitudinal axis substantially parallel with said central longitudinal axis of said valve assembly and said central longitudinal axis of said pneumatic valve.

10. The invention as recited in claim 9 wherein said central longitudinal axis of said pneumatic valve is substantially coincident with said central longitudinal axis of said valve assembly.

11. The invention as recited in claim 10 wherein said central longitudinal axis of said check valve is substantially coincident with said central longitudinal axis of said valve assembly.

12. The invention as recited in claim 9 wherein said central longitudinal axis of said check valve is substantially coincident with said central longitudinal axis of said valve assembly.

13. The invention as recited in claim 9 wherein a top portion of said check valve is configured for abutting engagement with a bottom portion of said pneumatic valve.

14. The invention as recited in claim 9 wherein said pneumatic valve is entirely housed within said valve assembly.

15. The invention as recited in claim 9 wherein said check valve is entirely housed within said valve assembly.

16. The invention as recited in claim 9 further comprising:

a poppet valve having at least a portion thereof reciprocatingly housed within said check valve, said poppet valve having a central longitudinal axis substantially parallel with said central longitudinal axis of said valve assembly and said central longitudinal axis of said pneumatic valve and said central longitudinal axis of said check valve, said poppet valve configured for selectively permitting fluid passage through said venturi gas channel based on a reciprocated position of said poppet valve.

17. The invention as recited in claim 9 wherein said central longitudinal axis of said venturi gas channel is substantially coincident with said central longitudinal axis of said valve assembly.

18. The invention as recited in claim 9 further comprising:

a check valve biasing spring for biasing said check valve away from said pneumatic valve.

19. The invention as recited in claim 9 further comprising:

a vacuum producing assembly having an exhaust housing coupled to a top end of said valve assembly housing; and an overall length of said vacuum producing assembly being less than 3.0 inches.

20. The invention as recited in claim 9 further comprising:

a vacuum producing assembly having an exhaust housing coupled to a top end of said valve assembly housing; and an overall length of said vacuum producing assembly being less than 5.0 inches.

* * * * *